US012736459B2

(12) United States Patent
Kim et al.

(10) Patent No.: US 12,736,459 B2
(45) Date of Patent: Sep. 15, 2026

(54) PARTICLE MEASUREMENT DEVICE

(71) Applicant: DONGWOO FINE-CHEM CO., LTD., Jeollabuk-do (KR)

(72) Inventors: Young Hoon Kim, Gyeonggi-do (KR); Su Yeon Oh, Gyeonggi-do (KR); Min Ju Lee, Gyeonggi-do (KR); Seung Pil Han, Jeollabuk-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 172 days.

(21) Appl. No.: 18/699,689

(22) PCT Filed: Nov. 30, 2022

(86) PCT No.: PCT/KR2022/019226
§ 371 (c)(1),
(2) Date: Apr. 9, 2024

(87) PCT Pub. No.: WO2023/101425
PCT Pub. Date: Jun. 8, 2023

(65) Prior Publication Data
US 2025/0237595 A1 Jul. 24, 2025

(30) Foreign Application Priority Data
Dec. 2, 2021 (KR) ........................ 10-2021-0170655

(51) Int. Cl.
*G01N 15/1434* (2024.01)
*G01N 15/1404* (2024.01)

(52) U.S. Cl.
CPC ..... *G01N 15/1436* (2013.01); *G01N 15/1404* (2013.01)

(58) Field of Classification Search
CPC ....................... G01N 15/1436; G01N 15/1404
See application file for complete search history.

(56) References Cited

U.S. PATENT DOCUMENTS 5,316,983 A * 5/1994 Fujimori ............ G01N 15/0205 356/336
6,408,681 B1 * 6/2002 Gurton ............... G01N 21/1702 73/24.02
(Continued)

FOREIGN PATENT DOCUMENTS

CN 104697933 A * 6/2015
CN 206611578 U * 11/2017
(Continued)

OTHER PUBLICATIONS

International Search Report for PCT/KR2022/019226 mailed on Mar. 8, 2023.
(Continued)

*Primary Examiner* — Michelle M Iacoletti
*Assistant Examiner* — Jarreas Underwood
(74) *Attorney, Agent, or Firm* — The PL Law Group, PLLC

(57) ABSTRACT

A particle measuring device includes a flow cell unit including a cell hollow portion in which a liquid sample flows, a mount unit including an accommodation hole accommodating at least a portion of the flow cell unit, and a resonance unit positioned behind the mount unit and coupled to the mount unit. The mount unit includes a mount body in which the accommodation hole is formed, and a passage hole depressed in an outer surface of the mount body and communicating with the accommodation hole. The resonance unit includes a resonance body behind the mount body and coupled to the mount body, and a cavity that is a space formed in the resonance body and communicates with the passage hole.

12 Claims, 14 Drawing Sheets

(56) References Cited

U.S. PATENT DOCUMENTS

| | | | | |
|---|---|---|---|---|
| 9,772,274 | B2 | 9/2017 | Graham et al. | |
| 2017/0370826 | A1 | 12/2017 | Coombs | |
| 2020/0352450 | A1* | 11/2020 | Zhou | A61B 5/0095 |

FOREIGN PATENT DOCUMENTS

| | | | |
|---|---|---|---|
| CN | 110006859 | A | 7/2019 |
| JP | 2000-002648 | A | 1/2000 |
| JP | 2001-025465 | A | 1/2001 |
| JP | 2015-031525 | A | 2/2015 |
| JP | 2019-184419 | A | 10/2019 |
| KR | 10-2010-0040457 | A | 4/2010 |
| KR | 10-2324097 | B1 | 11/2021 |

OTHER PUBLICATIONS

Office action issued on May 23, 2022 from Korean Patent Office in a counterpart Korean Patent Application No. 10-2021-0170655 (all the cited references are listed in this IDS.) (English translation is also submitted herewith.).

Notice of Allowance issued on Sep. 21, 2022 from Korean Patent Office in a counterpart Korean Patent Application No. 10-2021-0170655 (all the cited references are listed in this IDS.) (English translation is also submitted herewith.).

Konstantinos Kaleris et al., “Laser-sound: optoacoustic transduction from digital audio streams”, Scientific Reports, 2021, vol. 11 (476), DOI:/10.1038/s41598-020-78990-z.

* cited by examiner

PARTICLE MEASUREMENT DEVICE

CROSS REFERENCE TO RELATED APPLICATIONS AND CLAIM OF PRIORITY

This application claims benefit under 35 U.S.C. 119, 120, 121, or 365 (c), and is a National Stage entry from International Application No. PCT/KR2022/019226, filed Nov. 30, 2022, which claims priority to the benefit of Korean Patent Application No. 10-2021-0170655 filed in the Korean Intellectual Property Office on Dec. 2, 2021, the entire contents of which are incorporated herein by reference.

BACKGROUND

1. Technical Field

The present disclosure relates to a particle measuring device. In particular, the present disclosure relates to a particle measuring device that amplifies an acoustic wave resulting from a shock wave generated from particles.

2. Background Art

Various organic and inorganic chemicals used in the manufacturing process of products requiring high precision, such as displays and semiconductors, require higher purity chemicals than the present to avoid a reduction in manufacturing yield, and high-level analytical techniques are being developed and newly applied to confirm the quality of high-purity chemicals. Among them, the importance of particle analysis is increasing, and even particles as small as 10 nanometers may affect the yield reduction and high integration of the semiconductor manufacturing process. Therefore, in addition to the need to develop a stable analytical method for quality control, the scalability of the technology must be ensured so that it is possible to analyze even the causes of defects that may occur in the manufacturing process.

A substance that is uniformly dispersed in a liquid in a molecular or ionic state is generally referred to as a solution. A state in which particles larger than normal molecules or ions and having a diameter of about 1 nm to 1,000 nm are dispersed in the solution without being aggregated or precipitated is referred to as a colloidal state, and particles in the colloidal state are called a colloid.

Research on microcolloids existing in the solution is focused on obtaining information on the physicochemical properties of a substance to be analyzed or improving the detection power of a separation analyzer. The analysis of colloidal particles until recently has a limit of 100 nm in size, and development of technology is required in that a high concentration sample is required for accurate analysis of colloidal particles of 100 nm or less.

As a method of measuring colloidal nanoparticles, a light scattering analysis method for checking a size of particles using a light scattering intensity is generally used. However, when measuring fine nanoparticles with a size smaller than 100 nm, even if scattered light is generated, the probability of detecting fine nanoparticles at a low concentration is rapidly reduced, thereby making it difficult to obtain reliable results. Further, there is a limit that a concentration of particles must be several ppm (parts per million) or more. As the size of particles increases, the scattering light intensity increases. On the other hand, because the area capable of scattering light is reduced as the size of particles decreases, an intensity of scattered light is weak, thereby making it difficult to measure. Therefore, since a relatively large number of particles must be able to contribute to the scattering, sensitivity is greatly reduced at a concentration below ppm.

When laser induced breakdown is generated by irradiating a laser beam to the nanoparticles, it may lead to a shock wave. When nanoparticles are measured by measuring an acoustic signal of the shock wave, noise in addition to the acoustic signal is easily measured at the same time as the acoustic signal, and thus there is a need to amplify the acoustic signal.

SUMMARY

An aspect of the present disclosure is to address the above-described and other problems.

Another aspect of the present disclosure is to provide a particle measuring device that amplifies an acoustic signal resulting from a shock wave generated from particles.

Another aspect of the present disclosure is to provide a particle measuring device including a resonance unit provided with a cavity amplifying an acoustic signal.

Another aspect of the present disclosure is to provide a particle measuring device including a mount unit provided with a passage hole communicating with a cavity.

Another aspect of the present disclosure is to provide a particle measuring device including a flow cell unit that is accommodated in a mount unit and flows a liquid sample containing particles.

Another aspect of the present disclosure is to provide a particle measuring device easily removing bubbles generated in a liquid sample flowing in a flow cell unit by forming the flow cell unit in an extended shape in an up-down direction.

Another aspect of the present disclosure is to provide a particle measuring device including a mount unit including both a passage hole, on which a laser beam is incident, and a passage hole communicating with a cavity.

In order to achieve the above-described and other aspects and needs, in one aspect of the present disclosure, there is provided a particle measuring device including a flow cell unit including a cell hollow portion in which a liquid sample flows; a mount unit including an accommodation hole accommodating at least a portion of the flow cell unit; and a resonance unit positioned behind the mount unit and coupled to the mount unit, wherein the mount unit includes a mount body in which the accommodation hole is formed; and a passage hole depressed in an outer surface of the mount body and communicating with the accommodation hole, wherein the resonance unit includes a resonance body behind the mount body and coupled to the mount body; and a cavity that is a space formed in the resonance body and communicates with the passage hole.

In another aspect of the present disclosure, there is provided a particle measuring device including a flow cell unit; a mount unit including a mount body, an accommodation hole formed in the mount body and accommodating at least a portion of the flow cell unit, and a passage hole depressed in an outer surface of the mount body and communicating with the accommodation hole; and a resonance unit including a resonance body behind the mount body and coupled to the mount body, and a cavity formed in the resonance body and communicating with the passage hole, wherein when a shock wave is generated in the flow cell unit, the cavity receives an acoustic signal resulting from the shock wave and amplifies the acoustic signal.

Effects of the particle measuring device according to the present disclosure are described as follows.

According to at least one aspect of the present disclosure, the present disclosure can provide a particle measuring device that amplifies an acoustic signal resulting from a shock wave generated from particles.

According to at least one aspect of the present disclosure, the present disclosure can provide a particle measuring device including a resonance unit provided with a cavity amplifying an acoustic signal.

According to at least one aspect of the present disclosure, the present disclosure can provide a particle measuring device including a mount unit provided with a passage hole communicating with a cavity.

According to at least one aspect of the present disclosure, the present disclosure can provide a particle measuring device including a flow cell unit that is accommodated in a mount unit and flows a liquid sample containing particles.

According to at least one aspect of the present disclosure, the present disclosure can provide a particle measuring device easily removing bubbles generated in a liquid sample flowing in a flow cell unit by forming the flow cell unit in an extended shape in an up-down direction.

According to at least one aspect of the present disclosure, the present disclosure can provide a particle measuring device including a mount unit including both a passage hole, on which a laser beam is incident, and a passage hole communicating with a cavity.

Additional scope of applicability of the present disclosure will become apparent from the detailed description given blow. However, it should be understood that the detailed description and specific examples such as embodiments of the present disclosure are given merely by way of example, since various changes and modifications within the spirit and scope of the present disclosure will become apparent to those skilled in the art from the detailed description.

DETAILED DESCRIPTION

Figure 1:
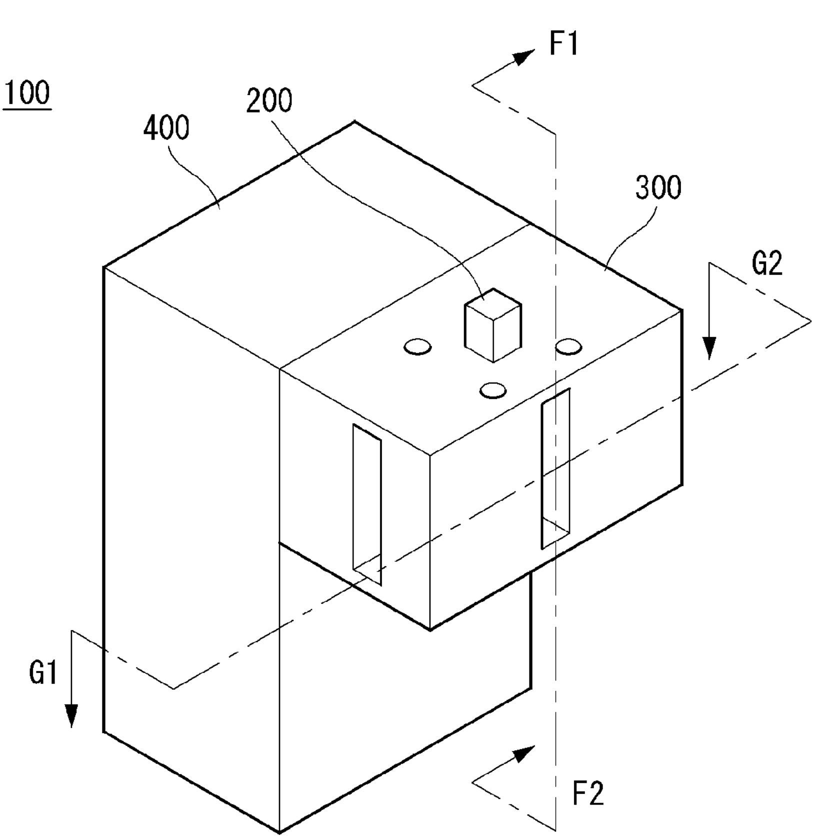
FIG. 1 illustrates a particle analysis device according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

A singular expression can include a plural expression as long as it does not have an apparently different meaning in context.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

In the drawings, sizes of the components may be exaggerated or reduced for convenience of explanation. For example, the size and the thickness of each component illustrated in the drawings are arbitrarily illustrated for convenience of explanation, and thus the present disclosure is not limited thereto unless specified as such.

If any embodiment is implementable differently, a specific order of processes may be performed differently from the order described. For example, two consecutively described processes may be performed substantially at the same time, or performed in the order opposite to the described order.

In the following embodiments, when layers, areas, components, etc. are connected, the following embodiments include both the case where layers, areas, and components are directly connected, and the case where layers, areas, and components are indirectly connected to other layers, areas, and components intervening between them. For example, when layers, areas, components, etc. are electrically connected, the present disclosure includes both the case where layers, areas, and components are directly electrically connected, and the case where layers, areas, and components are indirectly electrically connected to other layers, areas, and components intervening between them.

FIG. 1 illustrates a particle analysis device 100 according to an embodiment of the present disclosure.

Referring to FIG. 1, the particle analysis device 100 may include a flow cell unit 200. The flow cell unit 200 may flow a "nanoparticle sample in an aqueous solution state" (hereinafter, referred to as a "liquid sample"). In other words, the liquid sample may flow in the flow cell unit 200.

The flow cell unit 200 may form a shape extending in one direction. For example, the flow cell unit 200 may form an elongated shape in an up-down direction. For example, the liquid sample may be introduced into a lower end of the flow cell unit 200, rise in the flow cell unit 200, and flow out to an upper end of the flow cell unit 200.

A longitudinal direction of the flow cell unit 200 may be the up-down direction. When the longitudinal direction of the flow cell unit 200 is the up-down direction, bubbles generated in the liquid sample may rise and may be discharged to the outside of the flow cell unit 200.

Although not illustrated in FIG. 1, a laser beam may be incident on the flow cell unit 200. At least a portion of the laser beam incident on the flow cell unit 200 may pass through the flow cell unit 200 and may transfer energy to the liquid sample. When the liquid sample receives energy from the laser beam, plasma may be generated. That is, when the laser beam is incident on the flow cell unit 200, "laser induced breakdown" may be generated inside the flow cell unit 200.

The plasma generated inside the flow cell unit 200 may emit high energy. Hence, at a point where plasma is generated inside the flow cell unit 200, a temperature may rise to several thousand degrees Celsius (° C.) for a short moment, and a pressure inside the flow cell unit 200 may rapidly increase. Accordingly, a shock wave may be generated inside the flow cell unit 200.

That is, when the laser beam is incident on the flow cell unit 200, plasma and a shock wave may be generated inside the flow cell unit 200. For the measurement of the liquid sample, a method of measuring a flash resulting from the plasma and/or a method of measuring an acoustic wave resulting from the shock wave may be used. The acoustic wave resulting from the shock wave may be referred to as an "acoustic signal".

The particle analysis device 100 may include a mount unit 300. The mount unit 300 may accommodate the flow cell unit 200. A plurality of holes may be formed in the mount unit 300. The flow cell unit 200 may be exposed to the outside through the plurality of holes of the mount unit 300. The laser beam may pass through the mount unit 300 through any one of the plurality of holes of the mount unit 300 and may be incident on the flow cell unit 200.

The particle analysis device 100 may include a resonance unit 400. The resonance unit 400 may be coupled or connected to a rear face of the mount unit 300. When the liquid sample is measured by measuring the acoustic wave, noise may be mixed with the acoustic signal and may be measured together. If the noise is mixed with the acoustic signal and measured together, a measurement error of the liquid sample may occur. Therefore, it is necessary to increase a ratio of acoustic signal to noise by amplifying the acoustic signal.

The resonance unit 400 may amplify the acoustic signal. For example, the resonance unit 400 may amplify a sound of a specific frequency band. In particular, the resonance unit 400 may amplify an acoustic signal of a resonance frequency.

A frequency of the acoustic signal corresponding to a size of nanoparticles to be measured may be referred to as a "natural frequency". For example, the natural frequency may be included in the specific frequency band. For example, when the resonance frequency is close to the natural frequency, the resonance unit 400 can effectively amplify the acoustic signal resulting from the nanoparticles to be measured.

Figure 2:
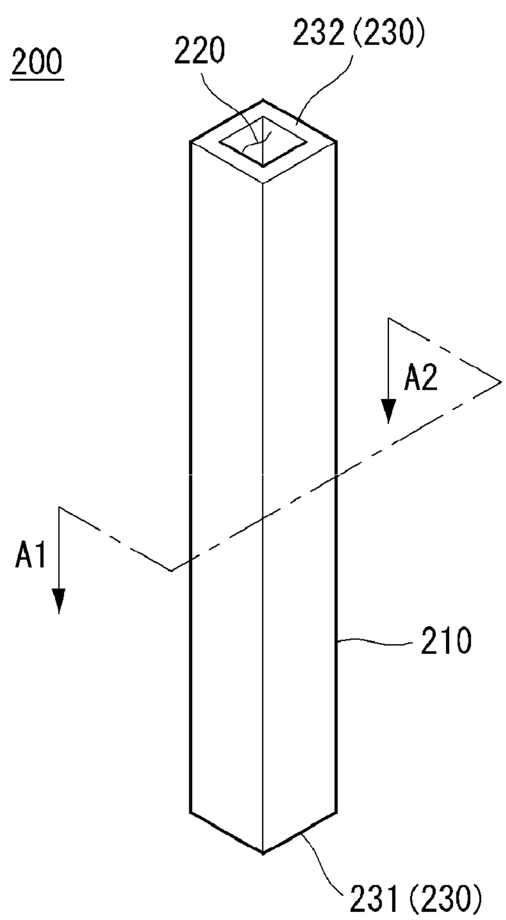
FIG. 2 illustrates a flow cell unit according to an embodiment of the present disclosure.

FIG. 2 illustrates the flow cell unit 200 according to an embodiment of the present disclosure.

Referring to FIG. 2, the flow cell unit 200 having cell ends (230) of a first cell end 231 and a second cell end 232. The flow cell unit may include a flow cell body 210. The flow cell body 210 may form a shape extending in one direction. For example, the flow cell body 210 may extend from the first cell end 231 to the second cell end 232.

The flow cell unit 200 may include a cell hollow portion 220. The cell hollow portion 220 may indicate a space formed inside the flow cell body 210. The cell hollow portion 220 may be connected to the cell end 232. For example, the cell hollow portion 220 may be opened at the cell end 232.

Figure 3:
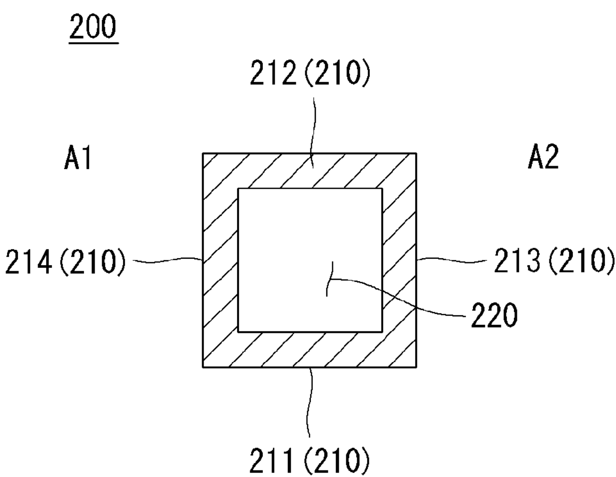
FIG. 3 illustrates a cross section taken along A1-A2 of a flow cell unit of FIG. 2.

FIG. 3 illustrates a cross section taken along A1-A2 of the flow cell unit 200 of FIG. 2.

Referring to FIG. 3, the flow cell body 210 may include a first cell window 211. The first cell window 211 may form a front face of the flow cell body 210.

The flow cell body 210 may include a second cell window 212. The second cell window 212 may form a rear face of the flow cell body 210. The second cell window 212 may be positioned behind the first cell window 211. The second cell window 212 may be spaced apart from the first cell window 211.

The flow cell body 210 may include a third cell window 213 and a fourth cell window 214. The third cell window 213 and the fourth cell window 214 may connect the first cell window 211 and the second cell window 212. The third cell window 213 and the fourth cell window 214 may face each other.

The cell windows 211, 212, 213 and 214 may indicate at least one of the first cell window 211, the second cell window 212, the third cell window 213, and the fourth cell window 214. The cell windows 211, 212, 213 and 214 may be formed of a material including a light transmitting material. For example, at least a part of the cell windows 211, 212, 213 and 214 may be formed of a material including quartz. The first cell window 211, the second cell window 212, the third cell window 213, and the fourth cell window 214 may be formed as a unibody.

The flow cell unit 200 may include the cell hollow portion 220. The cell hollow portion 220 may be formed by the cell windows 211, 212, 213 and 214. For example, the cell hollow portion 220 may be a space formed by the first cell window 211, the second cell window 212, the third cell window 213, and the fourth cell window 214. The cell hollow portion 220 may be a passage for the liquid sample.

Figure 4:
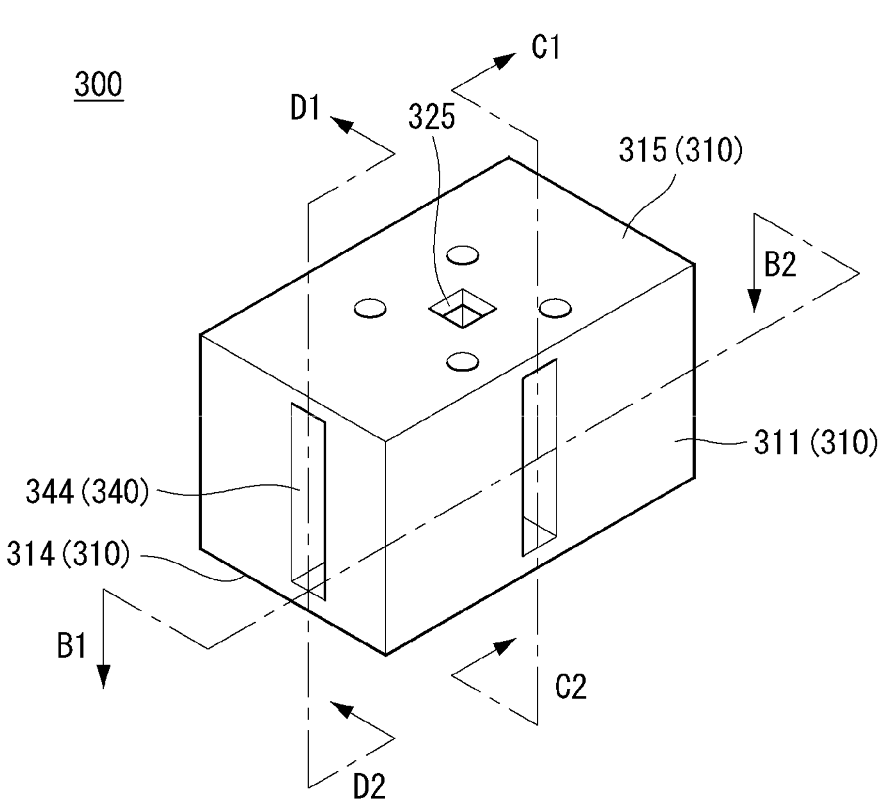
FIG. 4 illustrates a mount unit according to an embodiment of the present disclosure.

FIG. 4 illustrates the mount unit 300 according to an embodiment of the present disclosure.

Referring to FIG. 4, the mount unit 300 may include a mount body 310. The mount body 310 may form a skeleton of the mount unit 300. The mount body 310 may accommodate the flow cell unit 200 (see FIG. 1). In other words, the flow cell unit 200 (see FIG. 1) may be accommodated or coupled to the mount body 310.

The mount body 310 may include a first mount face 311. The first mount face 311 may form a front face of the mount body 310. The mount body 310 may include a fourth mount face 314. The fourth mount face 314 may be formed to extend from one side of the first mount face 311. For example, the fourth mount face 314 may form a left face of the mount body 310. The mount body 310 may include a fifth mount face 315. The fifth mount face 315 may form an upper face of the mount body 310.

The mount unit 300 may include a first accommodation hole end 325. The first accommodation hole end 325 may be formed at the mount body 310. The mount unit 300 may include a space for accommodating the flow cell unit 200 (see FIG. 1). The first accommodation hole end 325 may lead to the space for accommodating the flow cell unit 200 (see FIG. 1). The first accommodation hole end 325 may be positioned at the fifth mount face 315.

The mount unit 300 may include a passage inlet 340. The passage inlet 340 may be formed at the mount body 310. The mount unit 300 may include a passage communicating with a space accommodating the flow cell unit 200 (see FIG. 1). The passage inlet 340 may be connected to the passage.

Figure 5:
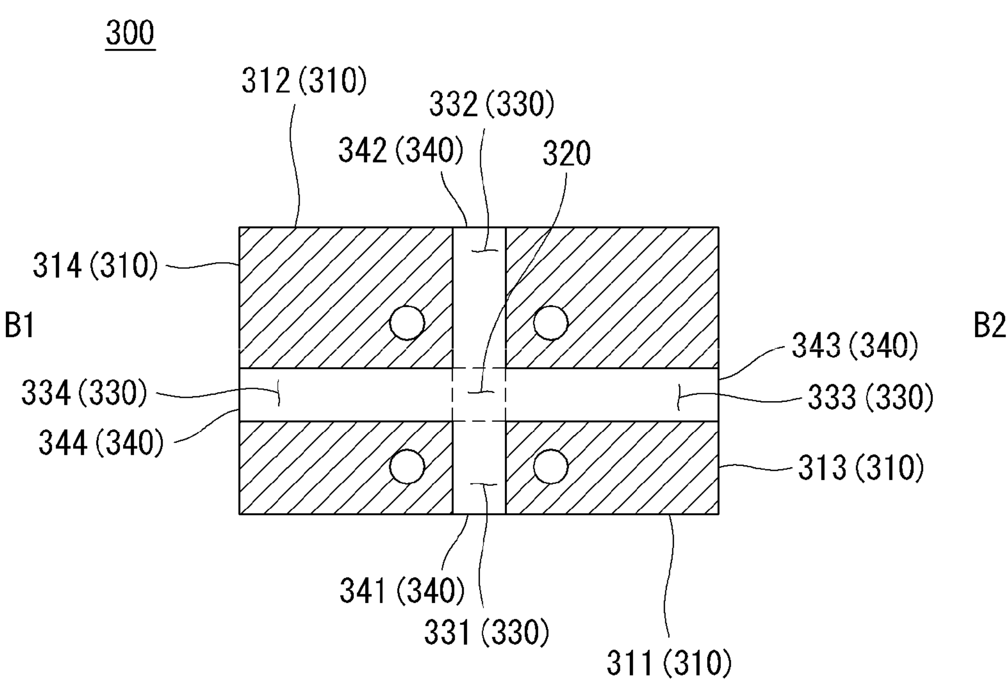
FIG. 5 illustrates a cross section taken along B1-B2 of a mount unit of FIG. 4.

FIG. 5 illustrates a cross section taken along B1-B2 of the mount unit 300 of FIG. 4.

Referring to FIG. 5, the mount body 310 may include the first mount face 311 and a second mount face 312. The first mount face 311 may form the front face of the mount body 310. The second mount face 312 may form a rear face of the mount body 310.

The mount body 310 may include a third mount face 313 and the fourth mount face 314. The third mount face 313 and the fourth mount face 314 may connect the first mount face 311 and the second mount face 312. The third mount face 313 and the fourth mount face 314 may face each other.

The mount unit 300 may include an accommodation hole 320. The accommodation hole 320 may be formed in the mount body 310. For example, the accommodation hole 320 may be formed to pass through the inside of the mount body 310.

The accommodation hole 320 may be a space in which the flow cell unit 200 (see FIG. 1) is accommodated. The accommodation hole 320 may be exposed to the outside. The accommodating hole 320 may be connected to the first accommodation hole end 325 (see FIG. 4).

The mount unit 300 may include a passage hole 330. The passage hole 330 may be formed in the mount body 310. The passage hole 330 may be connected to an outer surface of the mount body 310. The passage hole 330 may communicate with the accommodation hole 320. A dotted line illustrated in FIG. 5 may indicate a boundary between the passage hole 330 and the accommodation hole 320.

The passage hole 330 may include a first passage hole 331. The first passage hole 331 may lead to the first mount face 311. The first passage hole 331 may be depressed in the first mount face 311. The first passage hole 331 may communicate with the accommodation hole 320.

The passage hole 330 may include a second passage hole 332. The second passage hole 332 may lead to the second mount face 312. The second passage hole 332 may be depressed in the second mount face 312. The second passage hole 332 may communicate with the accommodation hole 320. The second passage hole 332 may be referred to as a "rear side passage hole".

The passage hole 330 may include a third passage hole 333. The third passage hole 333 may lead to the third mount face 313. The third passage hole 333 may be depressed in the third mount face 313. The third passage hole 333 may communicate with the accommodation hole 320.

The passage hole 330 may include a fourth passage hole 334. The fourth passage hole 334 may lead to the fourth mount face 314. The fourth passage hole 334 may be depressed in the fourth mount face 314. The fourth passage hole 334 may communicate with the accommodation hole 320.

The accommodation hole 320 may be positioned between the first passage hole 331 and the second passage hole 332. The accommodation hole 320 may be positioned between the third passage hole 333 and the fourth passage hole 334.

The mount unit 300 may include the passage inlet 340. The passage inlet 340 may be connected to the passage hole 330. The passage inlet 340 may be formed at the mount body 310. The passage inlet 340 may refer to a portion adjacent to the outer surface of the mount body 310 among the passage holes 330.

The passage inlet 340 may include a first passage inlet 341. The first passage inlet 341 may be positioned at the first mount face 311. The passage inlet 340 may include a second passage inlet 342. The second passage inlet 342 may be positioned at the second mount face 312. The passage inlet 340 may include a third passage inlet 343. The third passage inlet 343 may be positioned at the third mount face 313. The passage inlet 340 may include a fourth passage inlet 344. The fourth passage inlet 344 may be positioned at the fourth mount face 314.

Figure 6:
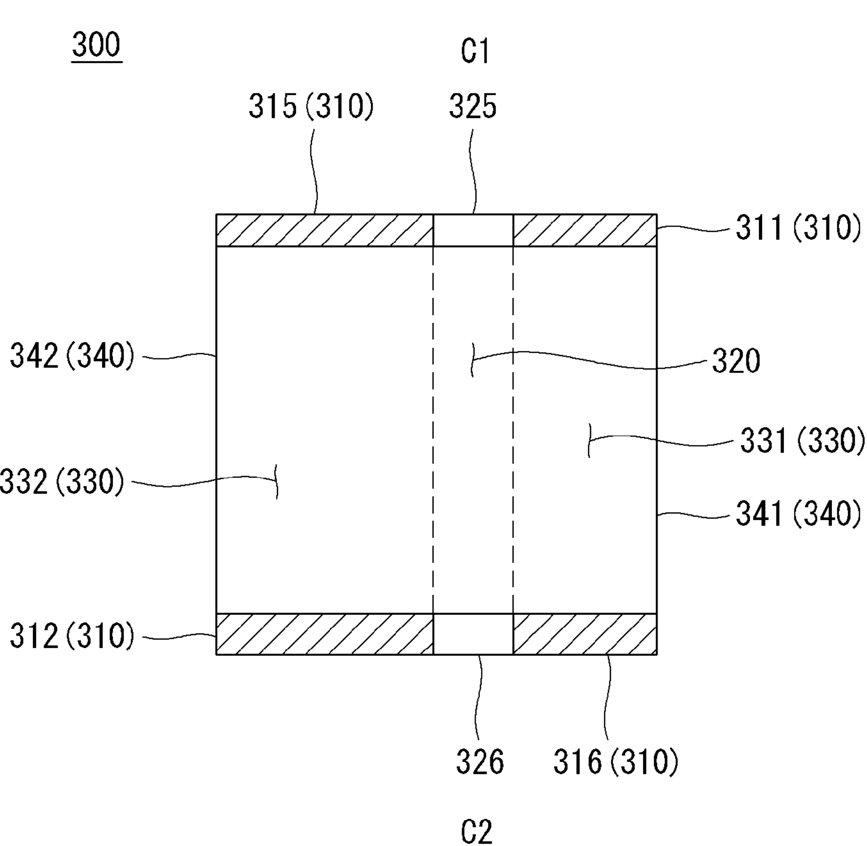
FIG. 6 illustrates a cross section taken along C1-C2 of a mount unit of FIG. 4.
Figure 7:
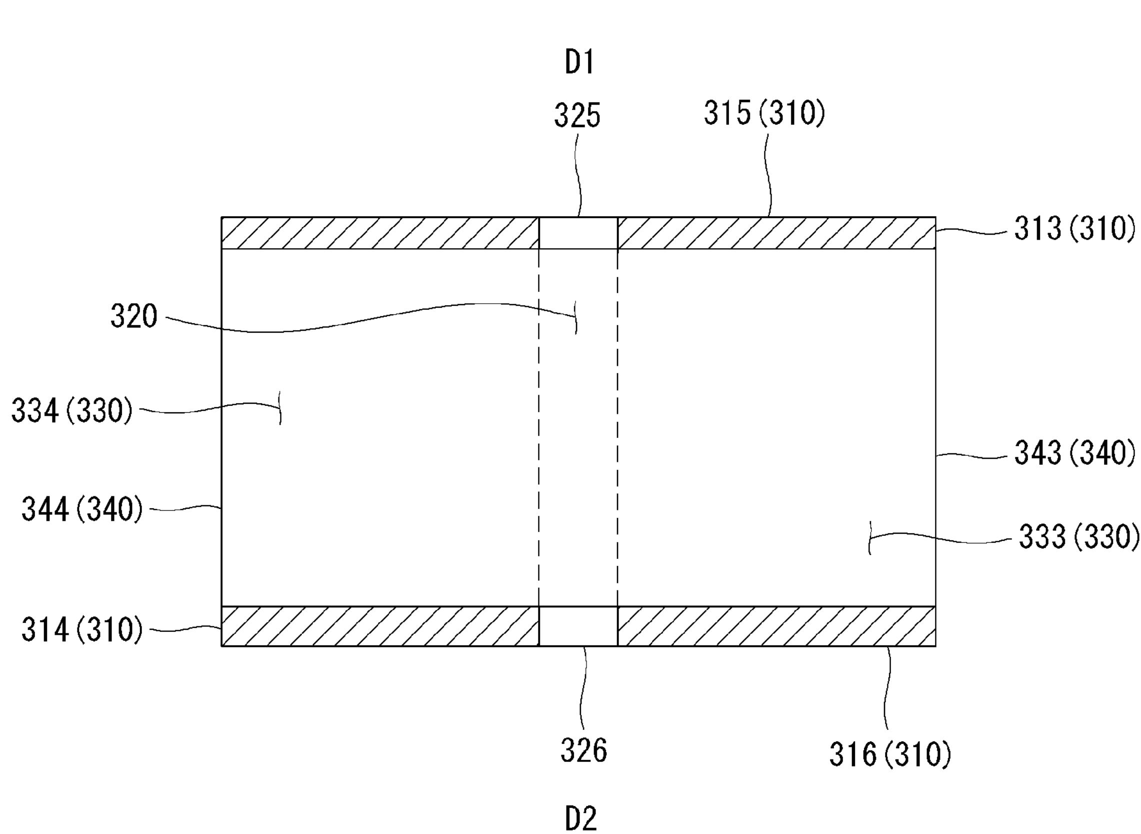
FIG. 7 illustrates a cross section taken along D1-D2 of a mount unit of FIG. 4.

FIG. 6 illustrates a cross section taken along C1-C2 of the mount unit 300 of FIG. 4. FIG. 7 illustrates a cross section taken along D1-D2 of the mount unit 300 of FIG. 4.

Referring to FIGS. 6 and 7, the mount body 310 may include a sixth mount face 316. The sixth mount face 316 may form a lower face of the mount body 310. The mount unit 300 may include a second accommodation hole end 326. The accommodation hole 320 may lead to the second accommodation hole end 326.

The accommodation hole 320 may extend from the first accommodation hole end 325 and lead to the second accommodation hole end 326. The direction in which the accommodation hole 320 extends may be the up-down direction. A dotted line illustrated in FIGS. 6 and 7 may indicate a boundary between the accommodation hole 320 and the passage hole 330.

Figure 8:
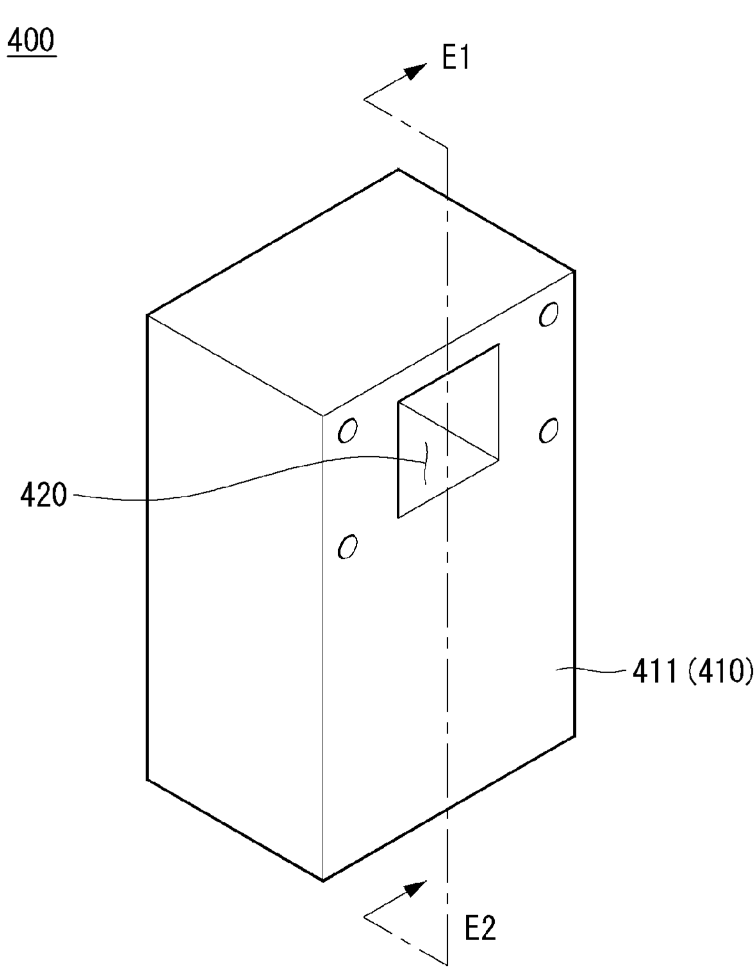
FIG. 8 illustrates a resonance unit according to an embodiment of the present disclosure.

FIG. 8 illustrates the resonance unit 400 according to an embodiment of the present disclosure.

Referring to FIG. 8, the resonance unit 400 may include a resonance body 410. The resonance body 410 may form a skeleton of the resonance unit 400. The resonance body 410 may include a first resonance body face 411. The first resonance body face 411 may form a front face of the resonance body 410.

The resonance unit 400 may include a cavity 420. The cavity 420 may be depressed in one face of the resonance body 410. For example, the cavity 420 may be depressed in the first resonance body face 411.

Figure 9:
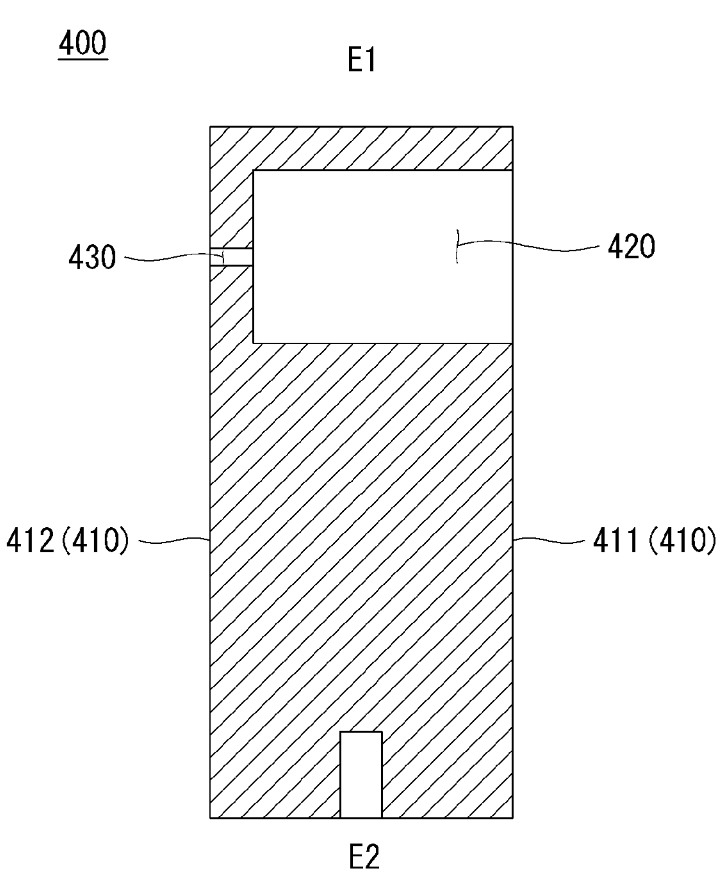
FIG. 9 illustrates a cross section taken along E1-E2 of a resonance unit of FIG. 8.

FIG. 9 illustrates a cross section taken along E1-E2 of the resonance unit 400 of FIG. 8.

Referring to FIG. 9, the resonance body 410 may include a second resonance body face 412. The second resonance body face 412 may form a rear face of the resonance body 410. The second resonance body face 412 may be spaced apart from the first resonance body face 411.

The resonance unit 400 may include a measurement hole 430. The measurement hole 430 may be depressed in the resonance body 410. For example, the measurement hole 430 may be depressed in the second resonance body face 412. As another example, the measurement hole 430 may be depressed in an upper surface or a side surface of the resonance body 410.

The measurement hole 430 may communicate with the cavity 420. At least a portion of an acoustic wave generated in front of the cavity 420 may sequentially pass through the cavity 420 and the measurement hole 430 and may be transferred to the outside of the resonance unit 400.

Figure 10:
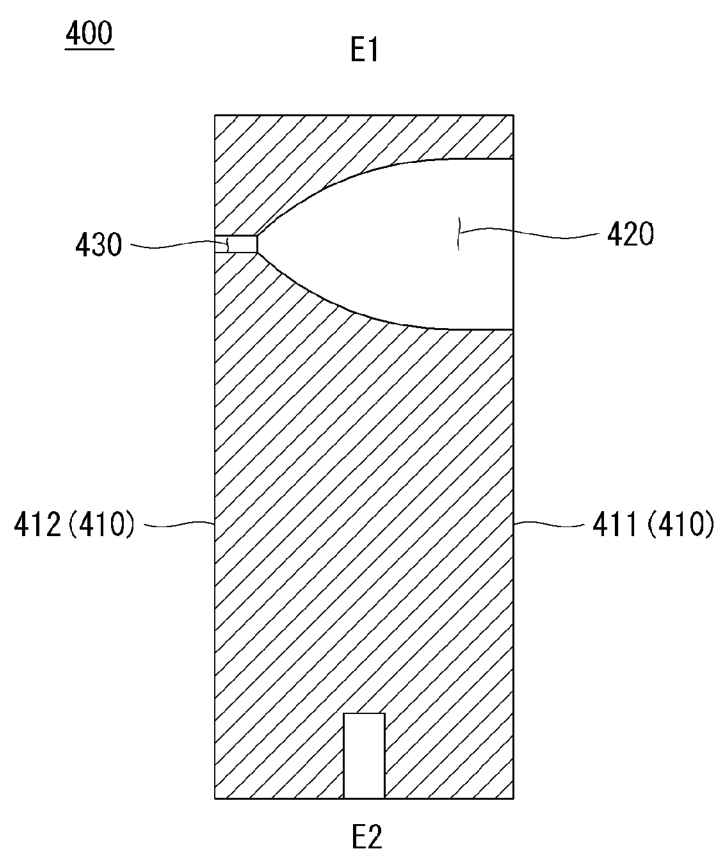
FIG. 10 illustrates a cavity forming a curved surface in a cross section taken along E1-E2 of a resonance unit of FIG. 8.

FIG. 10 illustrates the cavity 420 forming a curved surface in a cross section taken along E1-E2 of the resonance unit 400 of FIG. 8.

Referring to FIG. 10, a cross-section of the cavity 420 may be observed. The cavity 420 may form a curved surface. In other words, at least a portion of the cavity 420 may have a curved surface.

For example, at least a portion of the cavity 420 may have a shape of at least a portion of a cone. For example, at least a portion of the cavity 420 may have a shape of at least a portion of a cylinder. For example, at least a portion of the cavity 420 may have a shape of at least a portion of a half sphere. For example, at least a portion of the cavity 420 may have a shape of at least a portion of a paraboloid.

For another example, at least a portion of the cavity 420 may be planar. For example, at least a portion of the cavity 420 may have a shape of at least a portion of a rectangular parallelepiped. For example, at least a portion of the cavity 420 may have a shape of at least a portion of a quadrangular pyramid.

Figure 11:
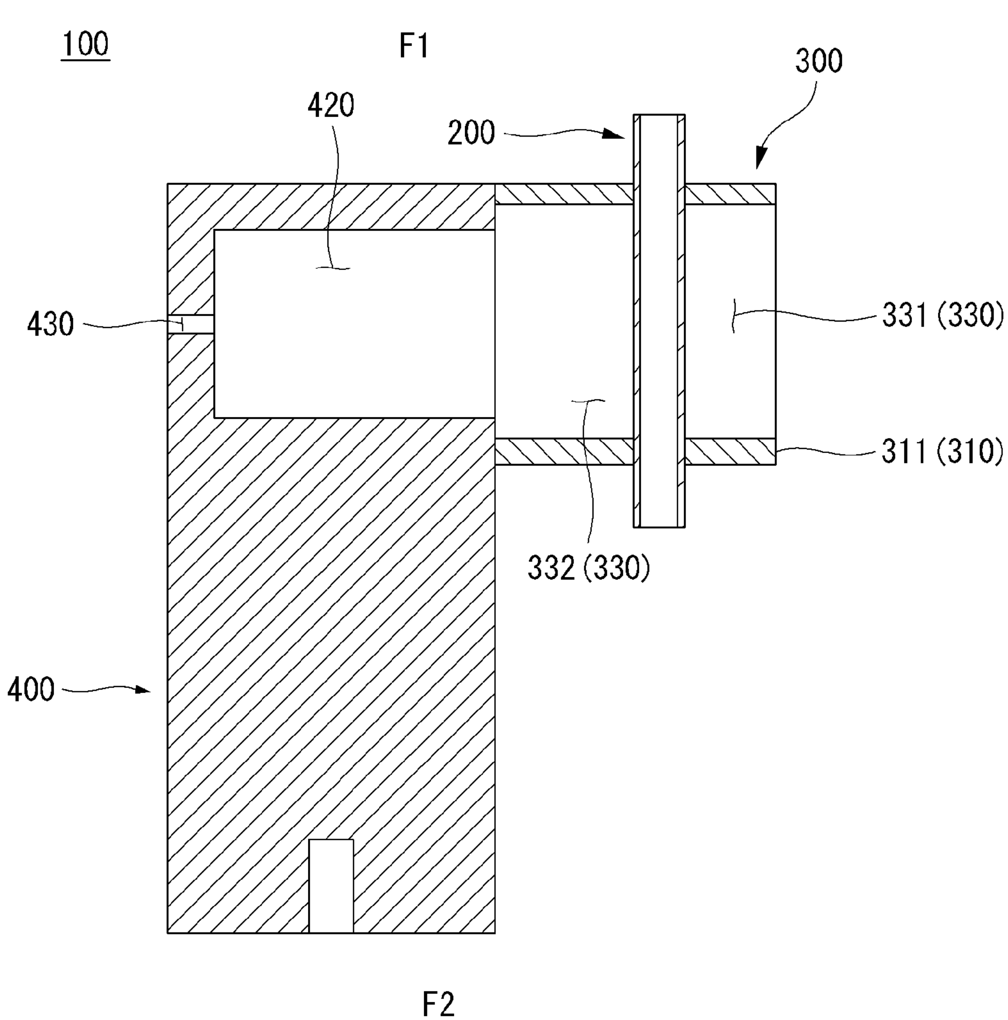
FIG. 11 illustrates a cross section taken along F1-F2 of a particle analysis device of FIG. 1.

FIG. 11 illustrates a cross section taken along F1-F2 of the particle analysis device 100 of FIG. 1.

Referring to FIG. 11, the flow cell unit 200 may be coupled to the mount unit 300. For example, the flow cell unit 200 may be inserted into the mount unit 300. The longitudinal direction of the flow cell unit 200 may be the up-down direction. The flow cell unit 200 may be disposed between the first passage hole 331 and the second passage hole 332.

The mount unit 300 may be coupled to the resonance unit 400. The mount unit 300 may be positioned in front of the resonance unit 400. For example, the second mount face 312 (see FIG. 5) of the mount unit 300 may face the first resonance body face 411 (see FIG. 8) of the resonance unit 400.

The second passage hole 332 of the mount unit 300 may communicate with the cavity 420 of the resonance unit 400. When a shock wave is generated in the flow cell unit 200, an acoustic signal may be generated. At least a portion of the acoustic signal may sequentially pass through the second passage hole 332, the cavity 420, and the measurement hole 430 and may proceed to the rear of the resonance unit 400.

Figure 12:
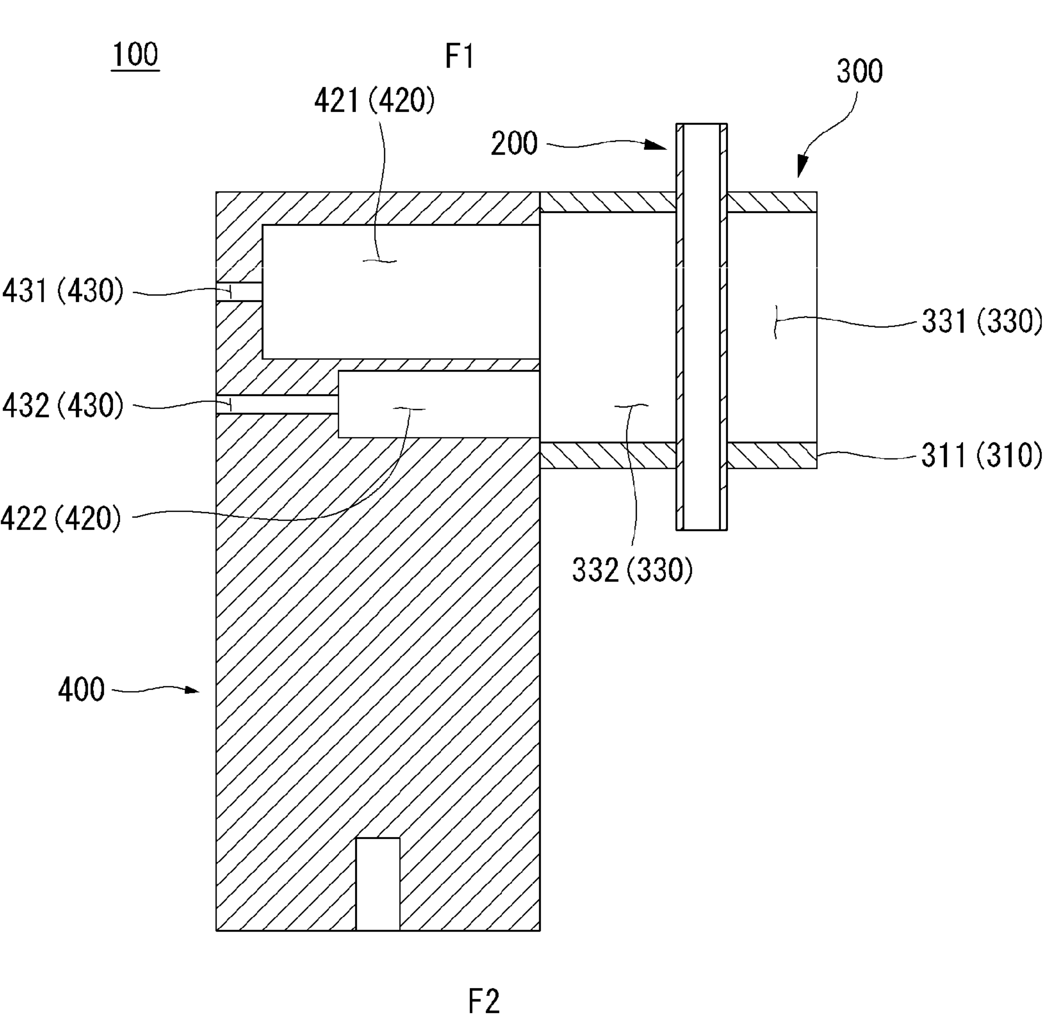
FIG. 12 illustrates a plurality of cavities in a cross section taken along F1-F2 of a particle analysis device of FIG. 1.

FIG. 12 illustrates a plurality of cavities 420 in a cross section taken along F1-F2 of the particle analysis device 100 of FIG. 1.

Referring to FIG. 12, a plurality of cavities 420 may be provided. For example, the cavities 420 may include a first cavity 421 and a second cavity 422. A size of the first cavity 421 may be different from a size of the second cavity 422. For example, a volume of the first cavity 421 may be greater than a volume of the second cavity 422. For example, a length in a front-rear direction of the first cavity 421 may be greater than a length in a front-rear direction of the second cavity 422. The second cavity 422 may be spaced apart from the first cavity 421. The first cavity 421 and the second cavity 422 may communicate with the second passage hole 332.

The first cavity 421 may amplify an acoustic wave of a first frequency band. For example, a first natural frequency may be included in the first frequency band. The first natural frequency may be a frequency of an acoustic signal generated from a shock wave when a size of nanoparticles to be measured is a first size.

The second cavity 422 may amplify an acoustic wave of a second frequency band. For example, a second natural frequency may be included in the second frequency band. The second natural frequency may be a frequency of an acoustic signal generated from a shock wave when a size of nanoparticles to be measured is a second size. The second natural frequency may be different from the first natural frequency A plurality of measurement holes 430 may be provided. For example, the measurement holes 430 may include a first measurement hole 431 and a second measurement hole 432. The first measurement hole 431 may be spaced apart from the second measurement hole 432.

The first measurement hole 431 may be depressed in the second resonance body face 412 (see FIG. 9). The first measurement hole 431 may communicate with the first cavity 421. The second measurement hole 432 may be depressed in the second resonance body face 412 (see FIG. 9). The second measurement hole 432 may communicate with the second cavity 421.

The first cavity 421 and the second cavity 422 may be disposed along the flow cell unit 200. That is, the first cavity 421 and the second cavity 422 may be disposed along the longitudinal direction of the flow cell unit 200. For example, the second cavity 422 may be positioned below the first cavity 421.

Figure 13:
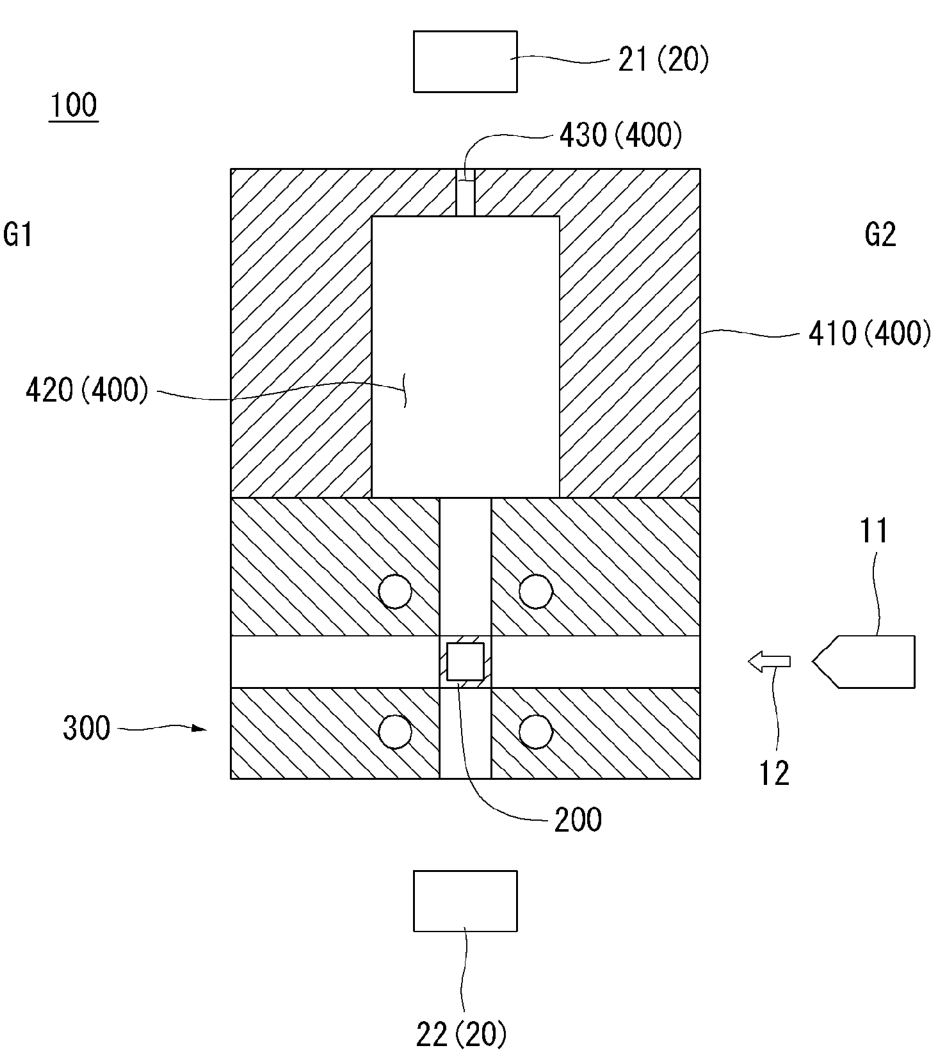
FIG. 13 illustrates a cross section taken along G1-G2 of a particle analysis device of FIG. 1.

FIG. 13 illustrates a cross section taken along G1-G2 of the particle analysis device 100 of FIG. 1. In FIG. 13, a laser generation unit 11, a laser beam 12, a first measurement unit 21, and a second measurement unit 22 are illustrated for convenience of explanation.

Referring to FIG. 13, a portion of the cavity 420 may be closed by the mount body 310 (see FIG. 5). Another portion of the cavity 420 may communicate with the second passage hole 332.

The laser generation unit 11 may generate the laser beam 12. The laser generation unit 11 may include an Nd:YAG laser. The laser beam 12 may be a pulsed laser beam. A center wavelength of the laser beam 12 may be 532 nm.

The laser beam 12 may travel toward the mount unit 300. For example, the laser beam 12 may travel through the third passage hole 333 (see FIG. 5). The third passage hole 333 (see FIG. 5) may be referred to as a "laser passage hole" or a "lateral side passage hole".

The laser beam 12 may be incident on the flow cell unit 200. A focus of the laser beam 12 may be inside the flow cell unit 200. In other words, the focus of the laser beam 12 may be positioned at the cell hollow portion 220 (see FIG. 3) of the flow cell unit 200.

When the laser beam 12 is incident on the flow cell unit 200, a shock wave may be generated inside the flow cell unit 200. The shock wave generates an acoustic signal, and the acoustic signal may proceed to the passage hole 330 (see FIG. 5).

The acoustic signal passing through the second passage hole 332 (see FIG. 5) may reach the cavity 420. An acoustic signal of a frequency band including a natural frequency may be amplified in the cavity 420. The acoustic signal may proceed to the measurement hole 430.

The first measurement unit 21 may be positioned behind the measurement hole 430. The first measurement unit 21 may face the measurement hole 430. At least a portion of the acoustic signal passing through the measurement hole 430 may be incident on the first measurement unit 21. The first measurement unit 21 may measure the acoustic signal. The first measurement unit 21 may acquire spectrum information of an amplitude for each frequency of the acoustic signal.

The second measurement unit 22 may face the first passage hole 331 (see FIG. 5). The second measurement unit 22 may be positioned in front of the first passage hole 331 (see FIG. 5). The second measurement unit 22 may measure the flash resulting from plasma generated inside the flow cell unit 200. A measurement unit 20 may indicate at least one of the first measurement unit 21 and the second measurement unit 22.

Figure 14:
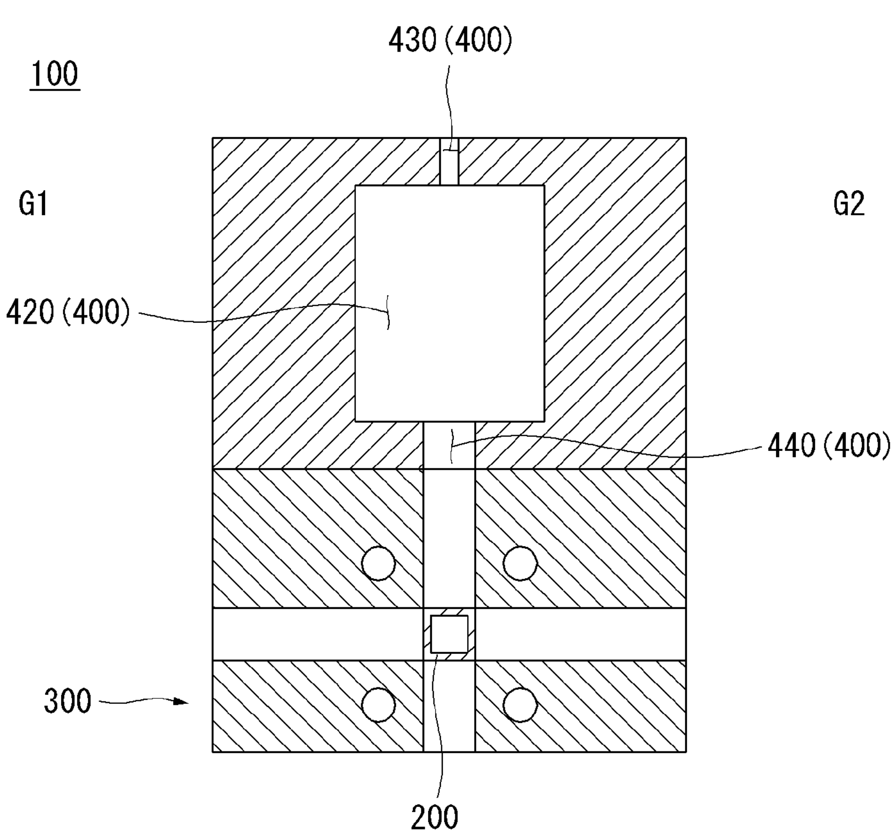
FIG. 14 illustrates a resonance unit provided with an incident hole in a cross section taken along G1-G2 of a particle analysis device of FIG. 1.

FIG. 14 illustrates a resonance unit provided with an incident hole in a cross section taken along G1-G2 of the particle analysis device 100 of FIG. 1.

Referring to FIG. 14, the resonance unit 400 may include an incident hole 440. The incident hole 440 may be depressed in the first mount face 311 (see FIG. 8) of the resonance body 410 (see FIG. 8). The incident hole 440 may communicate with the cavity 420.

The cavity 420 may connect the incident hole 440 and the measurement hole 430. The cavity 420 may be positioned inside the resonance body 410 (see FIG. 8). A size of the cavity 420 may be greater than a size of the incident hole 440 or a size of the measurement hole 430. For example, with reference to a cross section perpendicular to the front-rear direction, a cross section of the cavity 420 may be larger than a cross section of the measurement hole 430 or a cross section of the incident hole 440.

Some embodiments or other embodiments of the present disclosure described above are not mutually exclusive or distinct from each other. Configurations or functions of some embodiments or other embodiments of the present disclosure described above can be used together or combined with each other.

It is apparent to those skilled in the art that the present disclosure can be embodied in other specific forms without departing from the spirit and essential features of the present disclosure. Accordingly, the above detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

What is claimed is:

1. A particle measuring device comprising:
- a flow cell unit including a cell hollow portion in which a liquid sample flows;
- a mount unit including an accommodation hole accommodating at least a portion of the flow cell unit; and
- a resonance unit positioned behind the mount unit and coupled to the mount unit,
- wherein the mount unit includes:
  - a mount body in which the accommodation hole is formed; and
  - a passage hole depressed in an outer surface of the mount body and communicating with the accommodation hole,
- wherein the resonance unit includes:
  - a resonance body behind the mount body and coupled to the mount body;
  - a cavity for acoustic resonance that is an empty space without accommodating any other element and formed in the resonance body, the cavity communicating with the passage hole; and
  - a measurement hole depressed in a rear surface of the resonance body and communicating with the cavity, wherein with reference to a cross section perpendicular to a front-rear direction, a size of a cross section of the measurement hole is less than a size of a cross section of the cavity.

2. The particle measuring device of claim 1, wherein the cavity is depressed in a front face of the resonance body.

3. The particle measuring device of claim 1, wherein the cavity includes:
- a first cavity; and
- a second cavity spaced apart from the first cavity and having different size from the first cavity, and
- wherein the measurement hole includes:
- a first measurement hole that is depressed in the rear surface of the resonance body and communicates with the first cavity; and
- a second measurement hole that is depressed in the rear surface of the resonance body, communicates with the second cavity.

4. The particle measuring device of claim 3, wherein the first cavity and the second cavity are disposed side by side in a longitudinal direction of the flow cell unit.

5. The particle measuring device of claim 4, wherein the flow cell unit forms a shape elongated in an up-down direction, and
- wherein the first cavity and the second cavity are disposed in the up-down direction.

6. The particle measuring device of claim 1, wherein the cavity is positioned inside the resonance body, and
- wherein the resonance unit further includes an incident hole that is depressed in a front face of the resonance body, communicates with the cavity, and communicates with the passage hole.

7. The particle measuring device of claim 6, wherein with reference to a cross section perpendicular to a front-rear direction, a size of a cross section of the incident hole is less than a size of a cross section of the cavity.

8. The particle measuring device of claim 1, wherein the mount body includes:
- a first mount face forming a front face of the mount body; and
- a second mount face forming a rear face of the mount body and facing the resonance body, and
- wherein the passage hole includes:
- a first passage hole that is depressed in the first mount face and communicates with the accommodation hole; and
- a second passage hole that is depressed in the second mount face, communicates with the accommodation hole, and communicates with the cavity.

9. The particle measuring device of claim 8, wherein the mount body further includes a third mount face and a fourth mount face that connect the first mount face and the second mount face and face each other, and
- wherein the passage hole further includes:
- a third passage hole depressed in the third mount face and communicating with the accommodation hole; and
- a fourth passage hole depressed in the fourth mount face and communicating with the accommodation hole.

10. The particle measuring device of claim 1, wherein the passage hole includes:
- a rear side passage hole that is depressed in a rear face of the mount body, communicates with the accommodation hole, and communicates with the cavity; and
- a lateral side passage hole that is depressed in a lateral face of the mount body and communicates with the accommodation hole.

11. The particle measuring device of claim 10, wherein when a laser beam is irradiated on the flow cell unit through the lateral side passage hole, a plasma is generated in the liquid sample positioned in the cell hollow portion, and a shock wave is formed by the plasma; and at least a portion of an acoustic signal resulting from the shock wave sequentially passes through the rear side passage hole, the cavity and the measurement hole and is amplified in the cavity.

12. The particle measuring device of claim 11, wherein the resonance unit further includes a measurement hole depressed in a rear face of the resonance body and communicating with the cavity, and wherein the amplified acoustic signal passes through the measurement hole and proceeds to an outside of the resonance unit.

* * * * *